(12) United States Patent
Jeon et al.

(10) Patent No.: US 10,168,566 B2
(45) Date of Patent: Jan. 1, 2019

(54) NANOCAPSULE LIQUID CRYSTAL DISPLAY DEVICE

(71) Applicant: LG DISPLAY CO., LTD., Seoul (KR)

(72) Inventors: Ji-Na Jeon, Paju-si (KR); Kyeong-Jin Kim, Goyang-si (KR); Jung-Im Hwang, Goyang-si (KR); Min-Geon Choi, Paju-si (KR); Kyung-Su Ha, Gwangju (KR)

(73) Assignee: LG DISPLAY CO., LTD., Seoul (KR)

( * ) Notice: Subject to any disclaimer, the term of this patent is extended or adjusted under 35 U.S.C. 154(b) by 52 days.

(21) Appl. No.: 14/835,482

(22) Filed: Aug. 25, 2015

(65) Prior Publication Data

US 2016/0062175 A1     Mar. 3, 2016

(30) Foreign Application Priority Data

Sep. 1, 2014 (KR) .................. 10-2014-0115370

(51) Int. Cl.
| | | |
|---|---|---|
| *G02F 1/1333* | (2006.01) | |
| *G02F 1/1334* | (2006.01) | |
| *G02F 1/1335* | (2006.01) | |
| *G02F 1/1343* | (2006.01) | |

(52) U.S. Cl.
CPC ...... *G02F 1/133377* (2013.01); *G02F 1/1334* (2013.01); *G02F 1/133528* (2013.01); *G02F 1/134363* (2013.01); *G02F 2201/50* (2013.01); *G02F 2202/28* (2013.01); *G02F 2202/36* (2013.01)

(58) Field of Classification Search
None
See application file for complete search history.

(56) References Cited

U.S. PATENT DOCUMENTS

| | | | | |
|---|---|---|---|---|
| 2008/0048989 | A1* | 2/2008 | Yoon | G02F 1/13338 345/173 |
| 2010/0151228 | A1* | 6/2010 | Chin | B32B 27/08 428/323 |
| 2012/0113363 | A1* | 5/2012 | Lim | G02F 1/1334 349/96 |
| 2012/0188488 | A1* | 7/2012 | Hwang | G02F 1/1333 349/92 |
| 2012/0262651 | A1* | 10/2012 | Takeda | G02F 1/133371 349/96 |

(Continued)

FOREIGN PATENT DOCUMENTS

| | | |
|---|---|---|
| CN | 1412609 A | 4/2003 |
| CN | 1696787 A | 11/2005 |
| CN | 103597402 A | 2/2014 |

(Continued)

*Primary Examiner* — Richard H Kim
(74) *Attorney, Agent, or Firm* — Birch, Stewart, Kolasch & Birch, LLP

(57) ABSTRACT

Discussed is a nanocapsule liquid crystal display device. The nanocapsule liquid crystal display device according to an embodiment includes a substrate; a pixel electrode and a common electrode on the substrate; a first polarization plate disposed under the substrate and including a first polarization layer; and a second polarization plate contacting at least one of the pixel electrode and the common electrode and including a second polarization layer and a nanocapsule liquid crystal layer between the second polarization layer and the substrate.

11 Claims, 5 Drawing Sheets

(56) References Cited

U.S. PATENT DOCUMENTS

2014/0071379 A1\* 3/2014 Takahashi ......... G02F 1/133528
  349/62
2014/0168578 A1\* 6/2014 Wang .................... G02F 1/1334
  349/96

FOREIGN PATENT DOCUMENTS

| CN | 103913880 A | 7/2014 |
| KR | 10-2011-0095634 A | 6/2011 |

\* cited by examiner backlight(60)

backlight(150)

backlight(150)

NANOCAPSULE LIQUID CRYSTAL DISPLAY DEVICE

This application claims the priority benefit of Korean Patent Application No. 10-2014-0115370 filed in Korea on Sep. 1, 2014, which is hereby incorporated by reference for all purposes as if fully set forth herein.

BACKGROUND OF THE INVENTION

Field of the Invention

The present invention relates to a liquid crystal display (LCD) device. More particularly, the present invention relates to an LCD device including a nanocapsule liquid crystal layer integrated with a polarizing plate.

Discussion of the Related Art

Liquid crystal display (LCD) devices, which are widely used for TV, monitors, and so on because of characteristics adequate to display moving images and their high contrast ratio, use optical anisotropy and polarization properties of liquid crystal molecules to display images.

The LCD device requires a liquid crystal panel including two substrates and a liquid crystal layer therebetween. The alignment direction of the liquid crystal molecules can be controlled by application of an electric field across the liquid crystal molecules.

Since the liquid crystal panel does not include a light source, the LCD device requires a backlight. The backlight is disposed under the liquid crystal panel and includes a light source.

FIG. 1 is a cross-sectional view illustrating an LCD device according to the related art.

Referring to FIG. 1, the LCD device includes a liquid crystal panel 10 including an array substrate, a color filter substrate and a liquid crystal layer 50 between the array substrate and the color filter substrate, and a backlight unit 60 disposed below the liquid crystal panel 10. A first substrate 2 referred to as the array substrate includes a pixel region P. On an inner surface of the first substrate 2, a thin film transistor T is in each pixel region P and connected to a pixel electrode P in each pixel region P.

On an inner surface of a second substrate 4 referred to as the color filter substrate, a black matrix 32 is formed in a lattice shape surrounding the pixel region P to cover a non-display element such as the thin film transistor T and to expose the pixel electrode 28.

Red, green and blue color filters 34 are formed in the lattice shape corresponding to the respective pixel regions P, and a common electrode 36 is formed under the black matrix 32 and the color filters 34.

First and second polarizing plates 20 and 30 are attached to outer surfaces of the first and second substrates 2 and 4, respectively.

First and second alignment layers 31a and 31b are formed between both the pixel electrode 28 and the common electrode 36, and the liquid crystal layer 50. The first and second alignment layers 31a and 31b are rubbed and align liquid crystal molecules in the liquid crystal layer 50.

A seal pattern 70 is formed between and along peripheral regions of the first and second substrates 2 and 4 and prevents leakage of the liquid crystal.

The backlight unit 60 including the light source supplies light to the liquid crystal panel 10.

To provide the LCD device with improved response time, a new LCD device having a nanocapsule liquid crystal layer is introduced. The nanocapsule liquid crystal layer includes a plurality of nanocapsules, and nematic liquid crystal molecules, which are arranged randomly, are capsuled by each nanocapsule.

Since the nanocapsule liquid crystal layer does not have an initial alignment to be optically anisotropic, alignment of liquid crystal molecules may not be required. Thus, no alignment layer may be needed in the device, and also, processes for forming an alignment layer such as rubbing may not be needed.

In addition, since the nanocapsule liquid crystal layer is formed by a curing process, the second substrate 4 may be omitted if the color filter 34 and the common electrode 36 are formed on the first substrate 2.

Further, processes for forming a gap for the liquid crystal layer between the first and second substrates 2 and 4 may be omitted, and processes for forming the seal pattern for preventing leakages of the liquid crystal molecules may be omitted.

As a result, the process efficiency may be improved when the nanocapsule liquid crystal layer is used.

On the other hand, needs for an LCD device having a fast response time, light weight and thin profile is increased. The related art nanocapsule LCD device requires too many elements such that it is difficult to meet such needs.

SUMMARY OF THE INVENTION

Accordingly, the present invention is directed to a nanocapsule liquid crystal display (LCD) device that substantially obviates one or more of the problems due to limitations and disadvantages of the related art.

An advantage of the present invention is to provide a nanocapsule LCD device having a thin-profile and light weight.

An advantage of the present invention is to provide a nanocapsule LCD device that can improve its response time and/or production efficiency.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a nanocapsule liquid crystal display device according to an embodiment includes a substrate; a pixel electrode and a common electrode on the substrate; a first polarization plate disposed under the substrate and including a first polarization layer; and a second polarization plate contacting at least one of the pixel electrode and the common electrode and including a second polarization layer and a nanocapsule liquid crystal layer between the second polarization layer and the substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. in the drawings.

DETAILED DESCRIPTION OF THE ILLUSTRATED EMBODIMENTS

Reference will now he made in detail to exemplary embodiments, examples of which are illustrated in the accompanying drawings.

Figure 2:
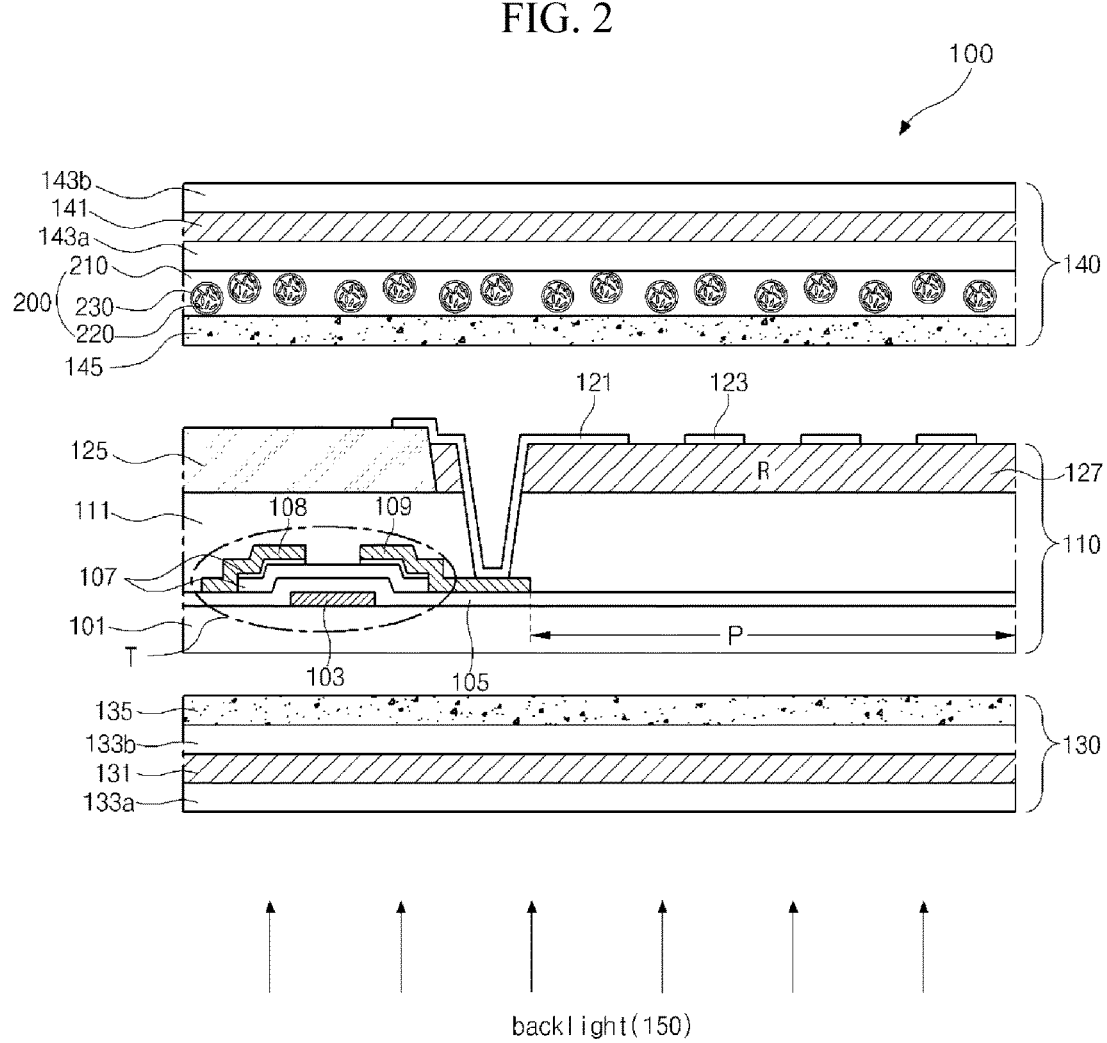
FIG. 2 is a cross-sectional view illustrating a capsule LCD device according to a first embodiment of the present invention.
Figure 3A:
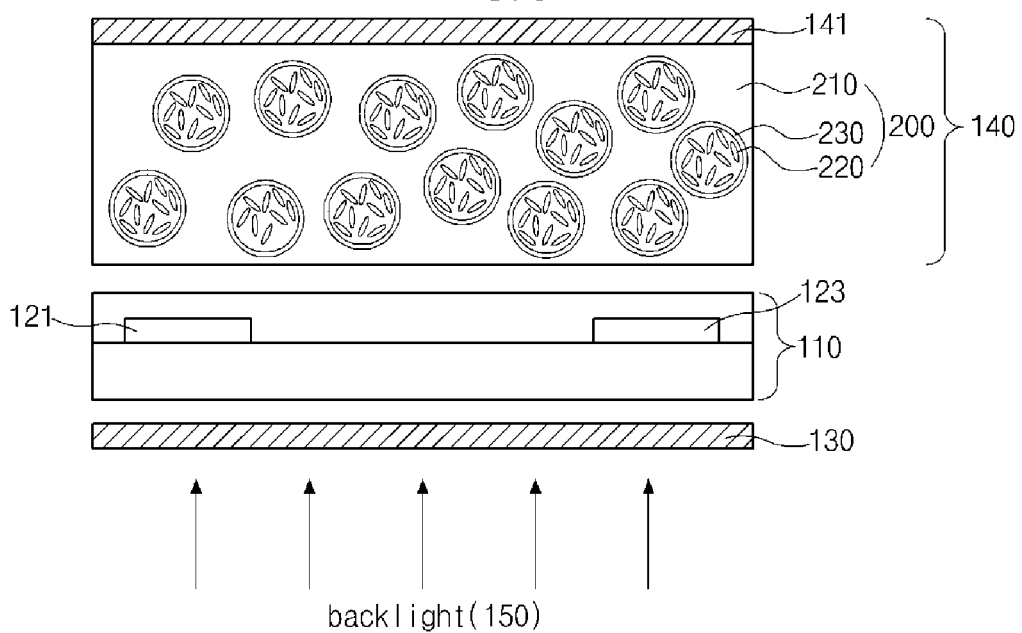
FIGS. 3A and 3B are schematic views illustrating an image display principle of a nanocapsule LCD device according to the first embodiment of the present invention.
Figure 3B:
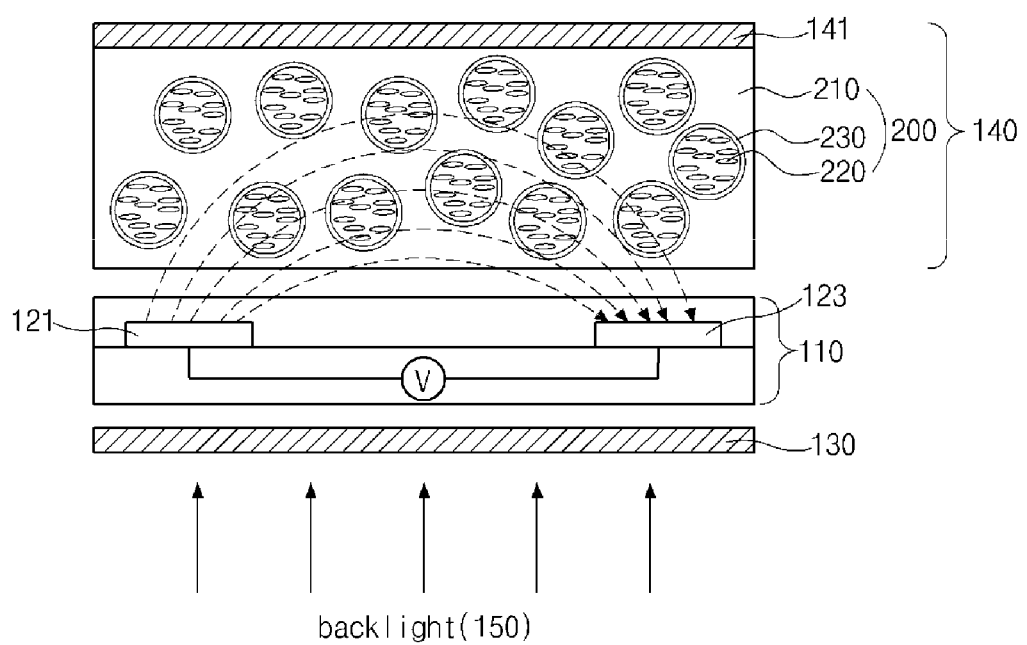

FIG. 2 is a cross-sectional view illustrating a nanocapsule LCD device according to a first embodiment of the present invention, and FIGS. 3A and 3B are schematic views illustrating an image display principle of a nanocapsule LCD device according to the first embodiment of the present invention. All the components of the nanocapsule LCD device according to all embodiments of the present invention are operatively coupled and configured.

Referring to FIGS. 2, 3A and 3B, a nanocapsule LCD device 100 includes an array substrate 110, first and second polarization plates 130 and 140 and a backlight 150.

A plurality of gate lines (not shown) and a plurality of data lines (not shown) are formed on an inner surface of a base substrate 101. The gate and data lines cross each other with a gate insulating layer 105 therebetween to define a pixel region P. A thin film transistor (TFT) T is formed near each crossing portion of the gate and data lines, and a passivation layer 111 is disposed on the TFT T. A. black matrix 125, which has a lattice shape surrounding each of the plurality of the pixel regions P and exposing each pixel region P, and a color filter layer 127 including a red color filter R, a green color filter (not shown) and a blue color filter (not shown), which are alternately arranged in each pixel region P, are disposed on the passivation layer 111.

A pixel electrode 121, which is connected to the corresponding TFT T, and a common electrode 123, which is spaced apart from the pixel electrode 121, are disposed on or over the color filter layer 127. The pixel and common electrodes 121 and 123 may be alternately arranged.

Each TFT T includes a gate electrode 103, the gate insulating layer 105, a semiconductor layer 107, a source electrode 108 and a drain electrode 109.

Each of the pixel electrode 121 and the common electrode 123 may include a plurality of branches having a bar shape and in each pixel region P. Although not shown, a common line, which is parallel to and disposed on the same layer as the gate line, is formed on the substrate 101. The common electrode 123 is connected to the common line.

Alternatively, the pixel electrode 121 may have a plate shape. In this instance, the common electrode 123 is disposed on a different layer from the pixel electrode 121 and has at least one opening. A portion of the pixel electrode 121 may overlap the gate line to form a storage capacitor.

The TFT T, the black matrix 125, the color filter layer 127, the pixel electrode 121 and the common electrode 123 on or over the substrate 101 preferably constitute the array substrate 110.

In the array substrate 110, the TFT T is disposed between the base substrate 101 and the pixel electrode, and the black matrix 125 and the color filter layer 127 are disposed between the base substrate 101 and the second polarization plate 140 as an upper polarization plate 140.

The first polarization plate 130 and the second polarization plate 140. which selectively transmit a pre-determined light, are attached to outer sides of the array substrate 110. Namely, the first polarization plate 130 is disposed between the base substrate 1.01 the backlight 150, and the second polarization plate 140 is disposed over a front side of the substrate 101. In other words, the backlight 150 is located below the first polarization plate 130. The second polarization plate 140 may contact the pixel and common electrodes 121 and 123. The first polarization plate 130 has a first polarization axis, and the second polarization plate 140 has a second polarization axis being perpendicular to the first polarization axis.

In all the embodiments of the present invention, the second polarization plate 140 includes a nanocapsule liquid crystal layer 200.

The nanocapsule liquid crystal layer 200 includes a plurality of nanocapsules 230 and a buffer layer 210. The nanocapsules 230 are dispersed in the buffer layer 210, with each including a plurality of liquid crystal molecules 220 therein. in other words, the plurality of liquid crystal molecules 220 are capsuled by each nanocapsule 230 having a nanosize. The nanocapsule liquid crystal layer 200 changes light transmittance to display images.

The nanocapsule liquid crystal layer 200 is an optically isotropic type liquid crystal layer in a normal state. Accordingly, when no electric field is applied to the nanocapsule liquid crystal layer 200, the nanocapsule liquid crystal layer 200 is optically isotropic in two or three dimension. However, when an electric field induced between the pixel electrode 121 and the common electrode 123 is applied, the nanocapsule liquid crystal layer 200 has a birefringence property in a direction perpendicular or parallel to the applied electric field.

Namely, when the liquid crystal molecules 220 in the nanocapsule 230 are negative type nematic liquid crystal molecule having (−) dielectric anisotropy, the liquid crystal molecules 220 are arranged to be perpendicular to the electric field to have the birefringence property. On the other hand, when the liquid crystal molecules 220 in the nanocapsule 230 are positive type nematic liquid crystal molecule having (+) dielectric anisotropy, the liquid crystal molecules 220 are arranged to be parallel to the electric field to have the birefringence property.

Accordingly, when an electric field is applied, the nanocapsule liquid crystal layer 200 may have an optically uniaxial property.

Each of the nanocapsules 230 may have about 5% to about 95% of a total volume of the nanocapsule liquid crystal layer 200, and preferably, may have about 25% to about 65% of the total volume of the nanocapsule liquid crystal layer 200. The buffer layer 210 occupies the rest of the total volume.

The buffer layer 210 may be made of a transparent or semi-transparent material and have water-solubility, fat-solubility, or mixture of water-solubility and fat-solubility. The buffer layer 210 may be heat cured or UV cured. The buffer layer 210 may have an additive to increase strength and reduce curing time.

A thickness, i.e., a cell gap, of the nanocapsule liquid crystal layer 200 including the nanocapsules 230 may be about 1 to about 10 micrometers, and preferably, may be about 2 to about 5 micrometers.

When the thickness, i.e., the cell gap, of the nanocapsule liquid crystal layer 200 is below 2 micrometers, the change of the light transmittance may not be sufficient to display images. On the other hand, when the thickness, i.e., the cell gap, of the nanocapsule liquid crystal layer 200 is above 5 micrometers, the electric field between the pixel electrode 121 and the common electrode 123 may not be applied to an upper portion of the nanocapsule liquid crystal layer 200 such that the power consumption may be increased. In addition, in such cases, since a total thickness of the nanocapsule LCD device 100 is increased, it may be difficult to use the nanocapsule LCD device as a flexible display device.

The nanocapsule 230 may have a diameter of about 1 nm to about 320 nm. and preferable, about 30 nm to about 100 nm. Because the nanocapsule 230 has a diameter less than any wavelengths of visible light, there occurs substantially no optical change due to refractive index, and optically isotropic property can be obtained. Further, scattering of visible light can be minimized.

Particularly, when the nanocapsule 230 is formed with a diameter of about 100 nm or less, a high contrast ratio can be obtained.

The backlight 150 is located below the array substrate 110 to supply light. Alternatively, the backlight 150 can be omitted in a reflective type LCD device.

The backlight 150 is categorized into a sidelight type and a direct type. The sidelight type backlight 150 can include a light source on at least one side of a light guide panel below the array substrate 110. The direct type backlight 150 can include at least one light source below the array substrate 110. The backlight 150 in the embodiments of the present invention is preferably the sidelight type or the directing type.

A cold cathode fluorescent lamp (CM), an external electrode fluorescent lamp (EEFL), or a light emitting diode (LED) may be used as a light source of the backlight 150.

Referring to FIG. 3A, in the off state of the nanocapsule LCD device 100, the liquid crystal molecules 220 in the nanocapsule liquid crystal layer 200 are arranged randomly such that the nanocapsule liquid crystal layer 200 is optically isotropic.

Accordingly, the light, which is emitted from the backlight 150, passing through the first polarizing plate 130 passes the nanocapsule liquid crystal layer 200 without optical change and is blocked by a second polarization layer 141 of the second polarizing plate 140, which has a polarization axis perpendicular to that of the first polarizing plate 130, such that the nanocapsule LCD device 100 has a black state.

Referring to FIG. 3B, when a horizontal electric field is generated between the pixel electrode 121 and the common electrode 123, the liquid crystal molecules 220 in the nanocapsule liquid crystal layer 200 are regularly arranged along the electric field such that an optical property of the light passing the nanocapsule liquid crystal layer 200 is changed. The light passing the nanocapsule liquid crystal layer 200 passes the second polarization layer 141 of the second polarizing plate 140 such that the nanocapsule LCD device 100 has a. white state.

In this case, it is preferred that a difference between the refractive index of the nanocapsule 230 and the refractive index of the liquid crystal molecules 220 is within about ±0.1. The average refractive index (n) of the liquid crystal molecules 220 may be defined as follows: $n=[(n_e+2*n_o)/3]$ (where $n_e$ is a refractive index of a major axis of the liquid crystal molecules 220, and $n_o$ is a refractive index of a minor axis of the liquid crystal molecules 220).

Accordingly, the nanocapsule LCD device 100 including the nanocapsule liquid crystal layer 200 can be used as a display device, with its transmittance changing according to a variation of the voltage applied.

Since the nanocapsule liquid crystal layer 200 does not have an initial alignment to be optically anisotropic, alignment of liquid crystal molecules may not be required, and thus no alignment layer may he needed in the nanocapsule LCD device 100, and also, processes for forming an alignment layer such as rubbing may not be needed.

Figure 1:
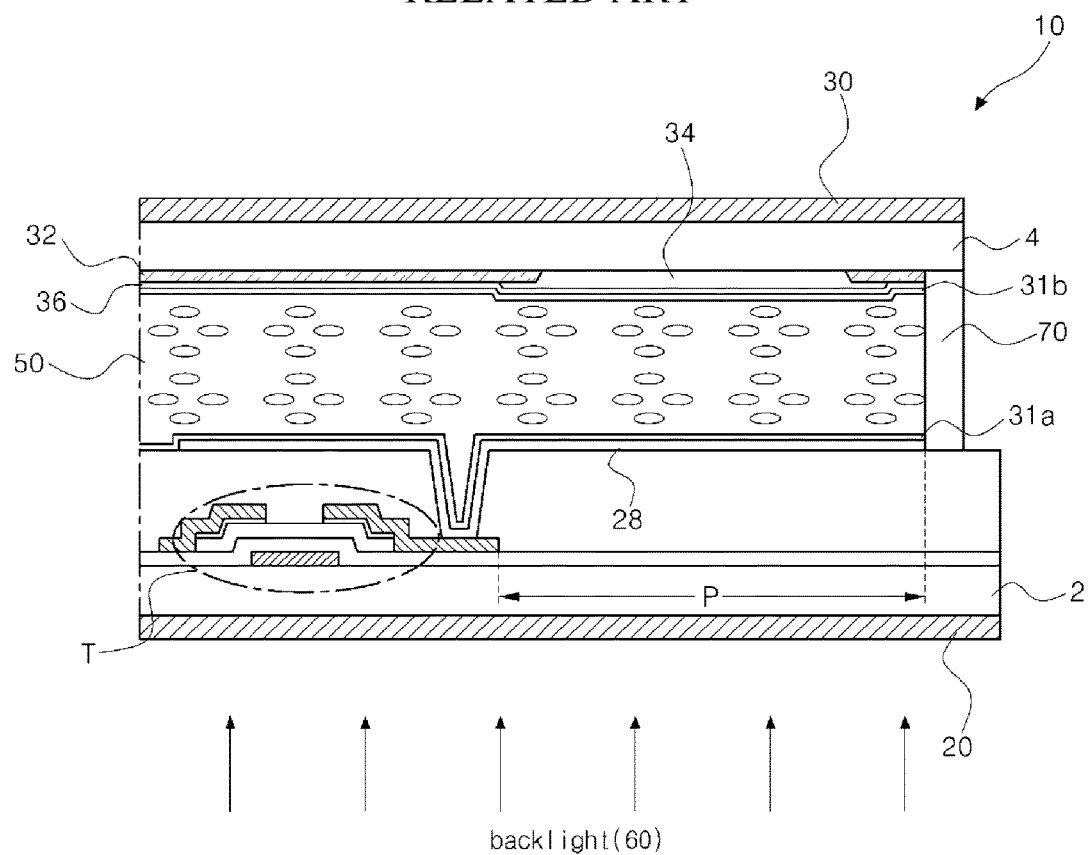
FIG. 1 is a cross-sectional view illustrating an LCD device according to the related art.

In addition, since the nanocapsule liquid crystal layer 200 is included in the second polarization plate 140, the second substrate 4 (of FIG. 1) of the related art can be omitted. Since the nanocapsule LCD device 100 has a thin profile without the second substrate 4, the nanocapsule LCD device 100 has advantages in the thickness and weight and can he effectively used as a flexible display device.

Moreover, processes for forming the nanocapsule liquid crystal layer on the array substrate 110 is omitted, and processes for forming a gap for the nanocapsule liquid crystal layer between the first and second substrates may be also omitted. Further, processes for forming a seal pattern for preventing leakages of the liquid crystal molecules is omitted. As a result, the process efficiency may be improved in the nanocapsule LCD device according to the embodiments of the present invention.

Further, when an external force is applied to the nanocapsule LCD device 100. the light leakage by the external force is not generated because mis-arrangement of the liquid crystal molecules 220 is prevented by the nanocapsule 230. Accordingly, if the nanocapsule LCD device 100 as a flexible display device is beaded or folded, there is no light leakage. Moreover, since the nanocapsule liquid crystal layer 200 is protected by the elements of the second polarization plate 140, damages on the nanocapsule liquid crystal layer 200 is prevented or minimized.

The first polarization plate 130 includes a first polarization layer 131, which has the first polarization axis, a first base film 133a and a second base film 133b. The first polarization layer 131 is positioned between the first and second base films 133a and 133b. As a result, the first polarization layer 131 is protected and supported by the first and second base films 133a and 133b.

The first polarization plate 130 is attached on a rear side of the base substrate 101 by a first adhesion layer 135 at an outer side of the second base film 133b.

The second polarization plate 140, which is attached to the pixel and common electrodes 121 and 123, includes the second polarization layer 141, which has the second polarization axis. a third base film 143a, a fourth base film 143b and the nanocapsule liquid crystal layer 200. The second polarization layer 141 is positioned between the third and fourth base films 143a and 143b. As a result, the second polarization layer 141 is protected and supported by the third and fourth base films 143a and 143b.

The nanocapsule liquid crystal layer 200 is disposed under the third base film 143a. Namely, the nanocapsule liquid crystal layer 200 is positioned between the third base film 143a and the array substrate 110, and the third base film 143a is positioned between the nanocapsule liquid crystal layer 200 and the second polarization layer 141. Upper and lower surfaces of the third base film 143a contact the second polarization layer 141 and the nanocapsule liquid crystal layer 200, respectively.

The second polarization plate 140 is attached on the array substrate 110 by a second adhesion layer 145 at an outer side of the nanocapsule liquid crystal layer 200. Namely, the nanocapsule liquid crystal layer 200 is positioned between the third base film 143a and the second adhesion layer 145 and protected by the third base film 143a and the second adhesion layer 145. As a result, damages on the nanocapsule liquid crystal layer 200 is prevented or minimized.

When the nanocapsule liquid crystal layer and the second polarization plate are separately formed, nanocapsule liquid crystal material is coated on the array substrate and cured to form the nanocapsule liquid crystal layer. In this instance, the nanocapsule liquid crystal layer is exposed before the second polarization plate is attached. Accordingly, the nanocapsule liquid crystal layer may be contaminated or damaged.

However, since the nanocapsule liquid crystal layer 200 in the embodiments of the present invention is integrated with the second polarization plate 140, the nanocapsule liquid crystal layer 200 is not exposed such that contamination or damage on the nanocapsule liquid crystal layer 200 is prevented or minimized.

A protection layer may be attached on an outer side of the first and second adhesion layers 135 and 145. When the first and second polarization plates 130 and 140 are attached to the array substrate 110, the protection layer is removed.

Although not shown, an anti-glare layer including silica beads may be formed on the fourth base film 143b. To improve a viewing angle, a discotic liquid crystal layer, where discotic liquid crystal molecules are arranged in a hybrid type, may he formed on the fourth base film 143b. In addition, a hard coating layer for preventing damages on the second polarization plate 140 or an anti-sticking layer for preventing close-contact with an adjacent layer may be further formed on the fourth base film 14M.

Figure 4:
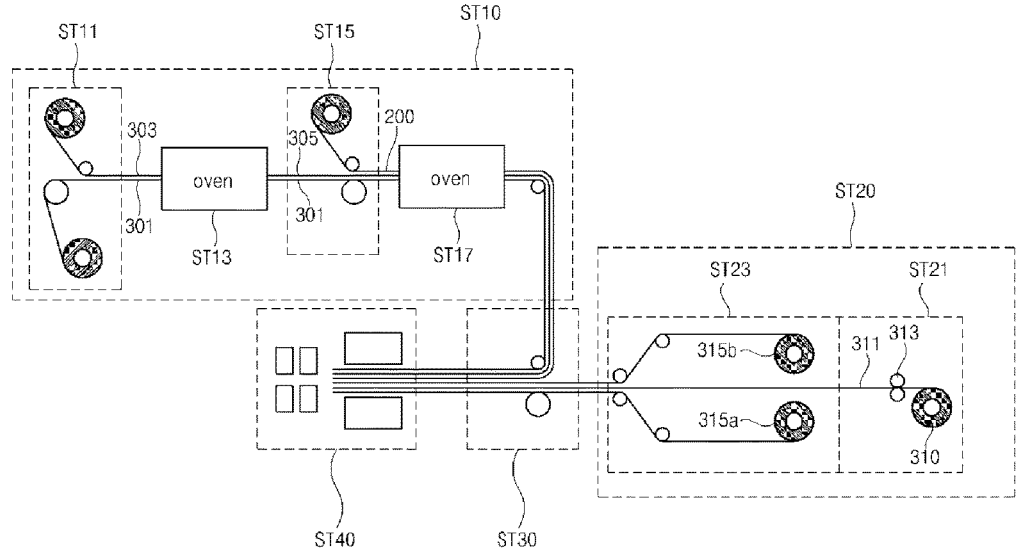
FIG. 4 is a schematic view illustrating a fabricating process a polarization plate including a nanocapsule liquid crystal layer according to an embodiment of the present invention.

FIG. 4 is a schematic view illustrating a fabricating process a polarization plate including a nanocapsule liquid crystal layer according to an embodiment of the present invention.

Referring to FIG. 4, a fabricating process of the second polarization plate 140 (of FIG. 2) includes a nanocapsule liquid crystal layer forming step "ST10", a polarization film forming step "ST20" and a lamination step "ST30".

The nanocapsule liquid crystal layer forming step "ST10" includes an adhesion layer coating step "ST11", a nanocapsule liquid crystal material coating step "ST15", a first drying step "ST13" and a second dry step "ST17". An adhesion material 303 is coated on a thin substrate 301 in the adhesion layer coating step "ST11", and the thin substrate 301, on which the adhesion material 303 is coated, is dried in a first oven in the first dry step "ST13". The adhesion material 303 is cured in a relatively high temperature in the first dry step "ST13" such that the adhesion layer 305 is formed on the thin substrate 301.

Next, a nanocapsule liquid crystal layer 200 is coated on the adhesion layer 305 in the nanocapsule liquid crystal material coating step "STI5". The nanocapsule liquid crystal layer 200 includes the nanocapsules 230 (of FIG. 2) and the buffer layer 210 (of FIG. 2) and has a liquid phase. The nanocapsule liquid crystal layer 200 may be coated by a printing method, a coating method or a dropping method.

Next, the thin substrate 301, where the nanocapsule liquid crystal layer 200 is coated, is dried in a second oven in the second dry step "ST17" to remove solvent in the buffer layer 210.

The thin, substrate 301, where the adhesion layer 305 and the nanocapsule liquid crystal layer 200 are formed, is transferred into the lamination step "ST30".

The polarization film forming step "ST20" includes an absorbing step "ST21" and a stretching step "ST23". In the absorbing step "ST21" and the stretching step "ST23", a base film 310 is stretched by using a roller 313, and the stretched base film 310 is dipped into a solution including iodine and dyes such that iodine and the dyes are absorbed into the stretched base film 310 and arranged along a stretching direction. By theses processes, a polarization layer 311 is provided.

Since iodine and the dyes have a dichroic property, the polarization layer 311 absorbs light being parallel to the stretching direction and transmits light being perpendicular to the stretching direction.

The base film 310 may be a triacetyl cellulose film. Alternatively, the base film may be formed of one of polyethylene terephthalate polymer, polyethylene naphthalate polymer, polyester polymer, polyethylene polymer, polypropylene polymer, polyvinylidene chloride polymer, polyvinyl alcohol polymer, polyethylene vinyl alcohol polymer, polystyrene polymer, polycarbonate polymer, norbornene polymer, poly methyl pentene polymer, polyether ketone polymer, polyether sulfone polymer, polysulfone polymer, polyether ketone imide polymer, polyamide polymer, polymethacrylate polymer, polyacrylate polymer, polyarylate polymer and fluoropolymer polymer.

First and second base films 315a and 315b are attached onto both sides of the polarization layer 311 by a roll-to-roll method such that a polarization film is provided. The stretching strength of the polarization layer 311 is supported and protected by the first and second base films 315a and 315b.

Next, the polarization layer 311 (having the first and second base films 315a and 315b) and the thin substrate 301, where the adhesion layer 305 and the nanocapsule liquid crystal layer 200 are formed, are laminated by a roll-to-roll method in the lamination step "ST30" such that the second polarization plate 140, which includes the polarization layer 141 (of FIG. 2), the third and fourth base films 143a and 143b (of FIG. 2), the nanocapsule liquid crystal layer 200 at an outer side of the third base film 143a and the adhesion layer 145 (of FIG. 2) at an outer side of the nanocapsule liquid crystal layer 200, is provided.

The thin substrate 310 at an outer side of the adhesion layer 305 is removed when the second polarization plate 140 is attached to the array substrate 110 (of FIG. 2).

The second polarization plate 140 is cut to have a size corresponding to the array substrate 210 in a cutting step "ST40".

As mentioned above, in the nanocapsule LCD device 100 including the nanocapsule liquid crystal layer 200 according to the first embodiment of the present invention, no alignment layer may be needed, and also, processes for forming an alignment layer such as rubbing may not he needed.

In addition, since the nanocapsule liquid crystal layer 200 is included in the second polarization plate 140. the second substrate 4 (of FIG. 1) of the related art can be omitted. Since the nanocapsule LCD device 100 has a thin profile without the second substrate 4, the nanocapsule LCI) device 100 has advantages in the thickness and weight and can be effectively used as a flexible display device.

Moreover, processes for forming the nanocapsule liquid crystal layer on the array substrate 110 is omitted, and processes for forming a gap for the nanocapsule liquid crystal layer between the first and second substrates may be also omitted. Further, processes for forming a seal pattern for preventing leakages of the liquid crystal molecules is omitted. As a result, the process efficiency may be improved in the nanocapsulse LCD device 100.

Further, when an external force is applied to the nanocapsule LCD device 100, the light leakage by the external force is not generated because mis-arrangement of the liquid crystal molecules 220 is prevented by the nanocapsules 230. Accordingly, when the nanocapsule LCD device 100 as a flexible display device is bended or folded, there is no light leakage. Since the nanocapsule liquid crystal layer 200 is protected by the elements of the second polarization plate 140, damages on the nanocapsule liquid crystal layer 200 is also prevented or minimized.

Particularly, since the nanocapsule liquid crystal layer 200 is disposed between the second adhesion layer 145 of the second polarization plate 140 and the third base film 143*a* of the second polarization plate 140, additional processes for forming the nanocapsule liquid crystal layer 200 on the array substrate 110 are omitted such that the process efficiency may be further improved.

Since the nanocapsule liquid crystal layer 200 is protected by the elements, e.g., the second adhesion layer 145 and the third base film 143*a*, of the second polarization plate 140, damage on the nanocapsule liquid crystal layer 200 is prevented or minimized.

Figure 5:
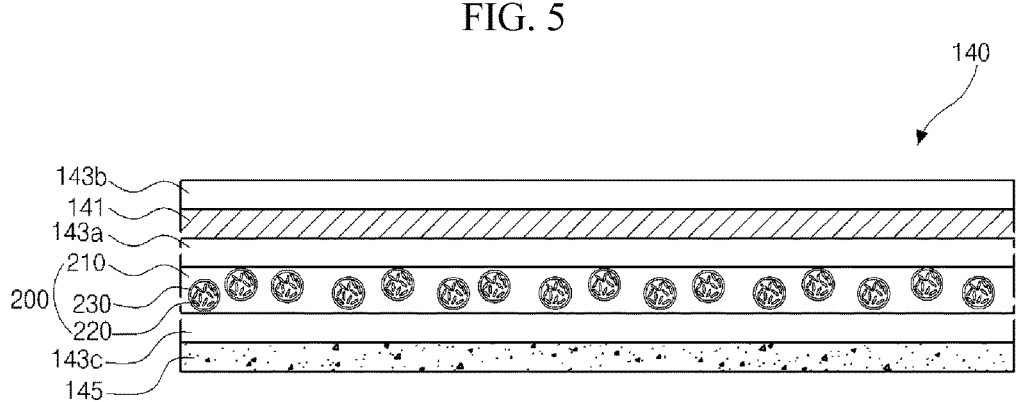
FIG. 5 is a cross-sectional view illustrating a polarization plate for a nanocapsule. LCD device according to a second embodiment of the present invention.

FIG. 5 is a cross-sectional view illustrating a polarization plate for a nanocapsule LCD device according to a second embodiment of the present invention.

As shown in FIG. 5, a second polarization plate 140 for a nanocapsule LCD device 100 (of FIG. 2) in the second embodiment of the present invention includes a second polarization layer 141, a third base film 143*a*, a fourth base film 143*b*, a fifth base film 143*c*, a nanocapsule liquid crystal layer 200 and a second adhesion layer 145. The second polarization plate 140 is disposed at an image displaying side of the nanocapsule LCD device 100 and is attached to the array substrate 110 (of FIG. 2) including the TFT T (of FIG. 2) and the color filter layer 127 (of FIG. 2). For instance, in comparison to the second polarization plate 140 of FIG. 2, the second polarization plate 140 of FIG. 5 further includes the fifth base film 145*c* provided between the nanocapsule liquid crystal layer 200 and the second adhesion layer 145.

Upper and lower surfaces of the third base film 143*a* contact the second polarization layer 141 and the nanocapsule liquid crystal layer 200. The fifth base film 143*c* is positioned between the nanocapsule liquid crystal layer 200 and the second adhesion layer 145, and upper and lower surface of the fifth base film 143*c* contact the nanocapsule liquid crystal layer 200 and the second adhesion layer 145.

Accordingly, the second adhesion layer 145 of the second polarization plate 140 directly contacts the pixel electrode 121 (of FIG. 2) and/or the common electrode 123 (of FIG. 2) of the array substrate 110 (of FIG. 2).

In the second polarization plate 140 of the second embodiment of the present invention, the second polarization layer 141 is positioned between the fourth base film 143*b* and the nanocapsule liquid crystal layer 200, and the nanocapsule liquid crystal layer 200 is positioned between the third base film 143*a* and the fifth base film 143*c*.

Accordingly, the second polarization layer 141 is protected and supported by the fourth base film 143*b* and the nanocapsule liquid crystal layer 200. and the nanocapsule liquid crystal layer 200 is protected and supported by the third base film 143*a* and the fifth base film 143*c*. As a result, the deformation and the damages on the nanocapsule liquid crystal layer 200 is prevented or minimized.

A protection layer may be attached on an outer side of the second adhesion layer 145. When the second polarization plate 140 is attached to the array substrate 110, the protection layer is removed.

Although not shown, an anti-glare layer including silica beads may be formed on the fourth base film 143*b*. To improve a viewing angle, a discotic liquid crystal layer, where discotic liquid crystal molecules are arranged in a hybrid type, may be formed on the fourth base film 143*b*. In addition, a hard coating layer for preventing damages on the second polarization plate 140 or an anti-sticking layer for preventing close-contact with an adjacent layer may be further formed on the fourth base film 143*b*.

As illustrated above, since the second polarization plate 140 includes the nanocapsule liquid crystal layer 200 between the third base film 143*a* and the fifth base film 143*c*, processes for forming the nanocapsule liquid crystal layer on the array substrate 110 can be omitted such that the process efficiency may be improved in the present invention.

Figure 6:
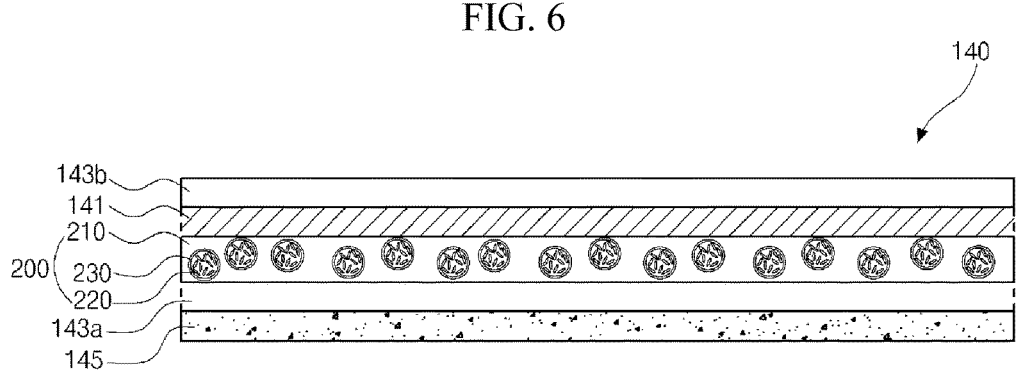
FIG. 6 is a cross-sectional view illustrating a polarization plate for a nanocapsule LCD device according to a third embodiment of the present invention.

In addition, since the nanocapsule liquid crystal layer 200 is protected by the elements, e.g., the third base film 143*a* and the fifth base film 143*c*, of the second polarization plate 140, damage on the nanocapsule liquid crystal layer 200 is prevented or minimized. FIG. 6 is a cross-sectional view illustrating a polarization plate for a nanocapsule LCD device according to a third embodiment of the present invention.

As shown in FIG. 6, a second polarization plate 140 for a nanocapsule LCD device 100 (of FIG. 2) in the third embodiment of the present invention includes a second polarization layer 141, a third base film 143*a*, a fourth base film 143*b*, a nanocapsule liquid crystal layer 200 and a second adhesion layer 145. The second polarization plate 140 is disposed at an image displaying side of the nanocapsule LCD device 100 and is attached to the array substrate 110 (of FIG. 2) including the TFT T (of FIG. 2) and the color filter layer 127 (of FIG. 2). The second polarization layer 141 is positioned between the fourth base film. 143*b* and the nanocapsule liquid crystal layer 200, and the nanocapsule liquid crystal layer 200 is positioned between the second polarization layer 141 and the third base film 143*a*. Upper and lower surfaces of the nanocapsule liquid crystal layer 200 contact the second polarization layer 141 and the third base film 143*a*, respectively.

Accordingly, the second adhesion layer 145 of the second polarization plate 140 directly contacts the pixel electrode 121 (of FIG. 2) and/or the common electrode 123 (of FIG. 2) of the array substrate 110 (of FIG. 2).

The second polarization layer 141 is protected and supported by the fourth base film 143*b* and the nanocapsule liquid crystal layer 200, and the nanocapsule liquid crystal layer 200 is protected and supported by the second polarization layer 141 and the third base film 143*a*. As a result, the deformation and the damages on the nanocapsule liquid crystal layer 200 is prevented.

A protection layer may be attached on an outer side of the second adhesion layer 145. When the second polarization plate 140 are attached to the array substrate 110, the protection layer is removed.

Although not shown, an anti-glare layer including silica beads may be formed on the fourth base film 143b. To improve a viewing angle, a discotic liquid crystal layer, where discotic liquid crystal molecules are arranged in a hybrid type, may be formed on the fourth base film 143b. In addition, a hard coating layer for preventing damages on the second polarization plate 140 or an anti-sticking layer for preventing close-contact with an adjacent layer may be further formed on the fourth base film 143b.

As illustrated above, since the second polarization plate 140 includes the nanocapsule liquid crystal layer 200 between the second polarization layer 141 and the third base film 143a, processes for forming the nanocapsule liquid crystal layer on the array substrate 110 can be omitted such that the process efficiency may be improved in the present LCD device.

In addition, since the nanocapsule liquid crystal layer 200 is protected by the elements, i.e., the second polarization layer 141 and the third base film 143a, of the second polarization plate 140, damages on the nanocapsule liquid crystal layer 200 is prevented or minimized.

Figure 7:
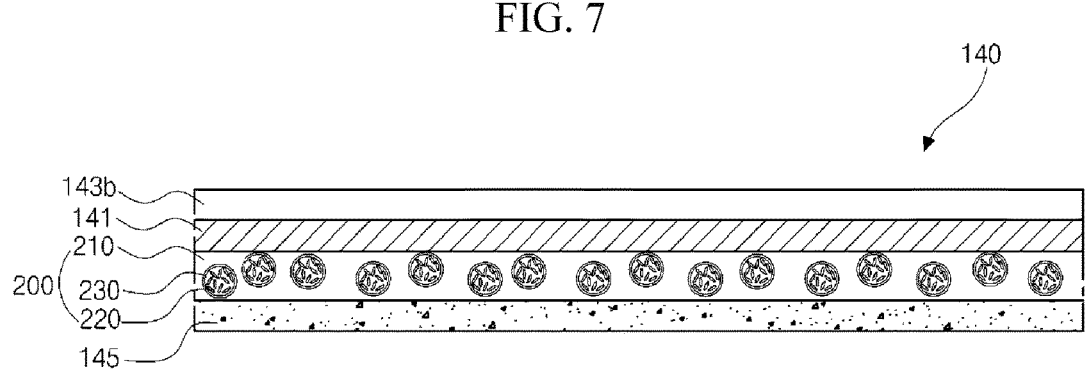
FIG. 7 is a cross-sectional view illustrating a polarization plate for a nanocapsule LCD device according to a fourth embodiment of the present invention.

FIG. 7 is a cross-sectional view illustrating a polarization plate for a nanocapsule LCD device according to a fourth embodiment of the present invention.

As shown in FIG. 7, a second polarization plate 140 for a nanocapsule LCD device 100 (of FIG. 2) in the fourth embodiment of the present invention includes a second polarization layer 141, a fourth base film 143b, a nanocapsule liquid crystal layer 200 and a second adhesion layer 145. The second polarization plate 140 is disposed at an image displaying side of the nanocapsule LCD device 100 and is attached to the array substrate 110 (of FIG. 2) including the TFT I (of FIG. 2) and the color filter layer 127 (of FIG. 2). For instance, there is no third base film 143a in the second polarization plate 140 of FIG. 7.

The second polarization layer 141 is positioned between the fourth base film 143b and the nanocapsule liquid crystal layer 200, and the nanocapsule liquid crystal layer 200 is positioned between the second polarization layer 141 and the second adhesion layer 145. Namely, the fourth base film 143b is disposed at an the second polarization layer 141, and the second adhesion layer 145 is disposed at an outer side of the nanocapsule layer 200. Upper and lower surfaces of the second polarization layer 141 contact the fourth base film 143b and the nanocapsule liquid crystal layer 200, respectively, and the second adhesion layer 145 directly contacts the at least one of the pixel electrode 121 (of FIG. 2) and the common electrode 123 (of FIG. 2).

The second polarization layer 141 is protected and supported by the fourth base film 143b and the nanocapsule liquid crystal layer 200.

Since the second polarization plate 140 does not include the third base film 143a (of FIG. 5 or FIG. 6), a thickness of the nanocapsule LCD device can be reduced. As a result, the nanocapsule LCD device 100 has advantages in the thickness and weight and can be used as a flexible display device.

In this instance, the buffer layer 210, where the nanocapsule 230 is dispersed, has a fat-solubility to have a role for protecting and providing the second polarization layer 141 instead of the third base film 143a (of FIG. 5 or FIG. 6). In addition, the buffer layer 210 may be transparent or semi-transparent.

The buffer layer 210 having the fat-solubility may be cured by a heat or a UV ray. To hardness of the nanocapsule liquid crystal layer 200 and reduce the curing time, additives may he added into the buffer layer 210.

The second adhesion layer 145 of the second polarization plate 140 directly contacts the pixel electrode 121 (of FIG. 2) and/or the common electrode 123 (of FIG. 2) of the array substrate 110 (of FIG. 2). The nanocapsule liquid crystal layer 200 is protected and supported by the second polarization layer 141 and the second adhesion layer 145. As a result, the deformation and the damages on the nanocapsule liquid crystal layer 200 is prevented A protection layer may be attached on an outer side of the second adhesion layer 145. When the second polarization plate 140 are attached to the array substrate 110, the protection layer is removed.

Although not shown, an anti-glare layer including silica beads may be formed on the fourth base film 143b. To improve a viewing angle, a discotic liquid crystal layer, where discotic liquid crystal molecules are arranged in a hybrid type, may be formed on the fourth base film 143b. In addition, a hard coating layer for preventing damages on the second polarization plate 140 or an anti-sticking layer for preventing close-contact with an adjacent layer may be further formed on the fourth base film 143b.

As illustrated above, in the second polarization plate 140 for the nanocapsule LCD device according to the fourth embodiment of the present invention, since the second polarization layer 141 is disposed between the fourth base film 143b and the nanocapsule layer 200 and the nanocapsule liquid crystal layer 200 is disposed between the second polarization layer 141 and the second adhesion layer 145, the third base film 143a (of FIG. 5 or FIG. 6) can be omitted. Accordingly, the nanocapsule LCD device 100 has advantages in the thickness and weight and can be used as a flexible display device, and the process efficiency may he improved.

In addition, since the second polarization plate 140 includes the nanocapsule liquid crystal layer 200 between the second polarization layer 141 and the second adhesion layer 145, processes for forming the nanocapsule liquid crystal layer on the array substrate 110 can be omitted such that the process efficiency may be further improved.

In addition, since the nanocapsule liquid crystal layer 200 is protected by the elements, i.e., the second polarization layer 141 and the second adhesion layer 145, of the second polarization plate 140, damage on the nanocapsule liquid crystal layer 200 is prevented or minimized.

Figure 8:
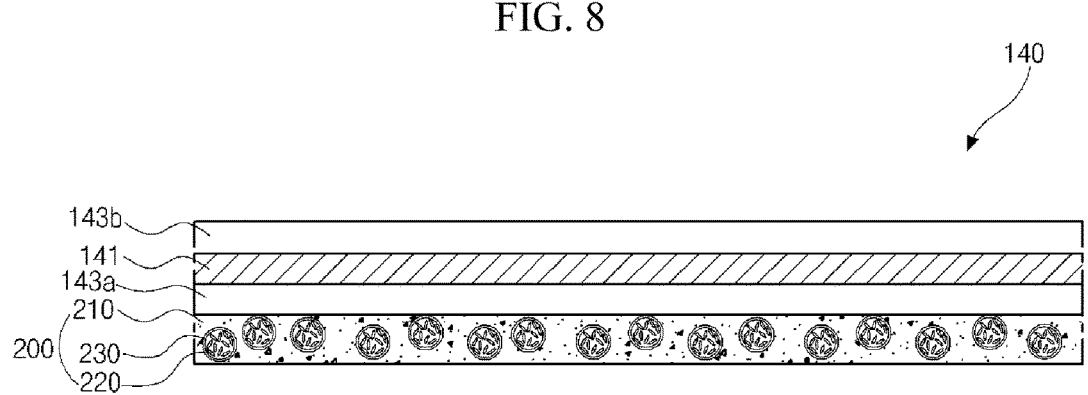
FIG. 8 is a cross-sectional view illustrating a polarization plate for a nanocapsule LCI) device according to a fifth embodiment of the present invention.

FIG. 8 is a cross-sectional view illustrating a polarization plate for a nanocapsule LCD device according to a fifth embodiment of the present invention.

As shown in FIG. 8. a second polarization plate 140 for a nanocapsule LCD device 100 (of FIG. 2) in the fifth embodiment of the present invention includes a second polarization layer 141, a third base film 143a, a fourth base film 143b and a nanocapsule liquid crystal layer 200. The second polarization plate 140 is disposed at an image displaying side of the nanocapsule LCD device 100 and is attached to the array substrate 110 (of FIG. 2) including the TFT T (of FIG. 2) and the color filter layer 127 of FIG. 2).

The second polarization layer 141 is positioned between the third and fourth base films 143 and 143b to be protected or supported by the third and fourth base films 143a and 143b.

In the fifth embodiment of the present invention, the nanocapsule liquid crystal layer 200 has an adhesive property and is disposed as a lowest layer of the second polarization plate 140. Namely, the nanocapsule liquid crystal layer 200 is disposed at an outer side of the third base film 143a under the second polarization layer 141 such that the nanocapsule layer 200 directly contacts the at least one of the pixel electrode 121 (of FIG. 2) and the common electrode 123 (of FIG. 2). In other words, the third and fourth base films 143a and 143b are disposed at both sides of the second polarization layer 141, respectively, wherein the third base film 143a is positioned between the second polarization layer 141 and the nanocapsule liquid crystal layer 200.

Since the second polarization plate 140 is attached onto the array substrate 100 by the nanocapsule liquid crystal layer 200, the second adhesion layer 145 (of FIG. 7) for attaching the second polarization plate 140 onto the array substrate 110 can be omitted. Namely, the nanocapsule liquid crystal layer 200 directly contacts the pixel electrode 121 (of FIG. 2) and/or the common electrode 123 (of FIG. 2), and the third base film 143a directly contacts the nanocapsule liquid crystal layer 200.

As a result, the nanocapsule LCD device 100 has advantages in the thickness and weight and can be used as a flexible display device, and the process efficiency may be improved.

In this instance, the buffer layer 210, where the nanocapsule 230 is dispersed, has a water-solubility, a fat-solubility or a hybrid property of the water-solubility and the fat-solubility to have a role for a adhesion layer instead of the second adhesion layer 145 (of FIG. 7). In addition, the buffer layer 2.10 may be transparent or semi-transparent.

The buffer layer 210 may be cured by a heat or a UV ray. To increase hardness of the nanocapsule liquid crystal layer 200 and reduce the curing time, additives may be added into the butler layer 210.

A protection layer may be attached on an outer side of the nanocapsule liquid crystal layer 200. When the second polarization plate 140 is attached to the array substrate 110, the protection layer is removed.

Although not shown, an anti-glare layer including silica beads may he formed on the fourth base film 143b. To improve a viewing angle, a discotic liquid crystal layer, where discotic liquid crystal molecules are arranged in a hybrid type, may be formed on the fourth base film 143b. In addition, a hard coating layer for preventing damages on the second polarization plate 140 or an anti-sticking layer for preventing close-contact with an adjacent layer may be further formed on the fourth base film 143b.

As illustrated above, in the second polarization plate 140 for the nanocapsule LCD device according to the fifth embodiment of the present invention, since the nanocapsule liquid crystal layer 200 in the second polarization plate 140 has an adhesion property, the second polarization plate 140 can be attached onto the array substrate 110 without additional adhesion layer. Accordingly, the nanocapsule LCD device 100 has advantages in the thickness and weight and can be used as a flexible display device, and the process efficiency may be improved.

In addition, since the second polarization plate 140 includes the nanocapsule liquid crystal layer 200, processes for forming the nanocapsule liquid crystal layer on the array substrate 110 can be omitted such that the process efficiency may be further improved.

In addition, since the nanocapsule liquid crystal layer 200 is protected by the third base film 143a and the protection film (not shown) before the second polarization plate 140 is attached onto the array substrate 110, damage on the nanocapsule liquid crystal layer 200 is prevented or minimized. Since the nanocapsule liquid crystal layer 200 is protected by the third base film 143a and the array substrate 110 after the second polarization plate 140 is attached onto the array substrate 110, damage on the nanocapsule liquid crystal layer 200 is prevented or minimized.

According to one or more embodiments, the nanocapsule LCD device 100 uses the backlight 150 as a light source. Alternatively, the nanocapsule LCD device 100 may he a reflective type using an ambient light as a light source without the backlight. In addition, the second polarization plate 140 including the nanocapsule liquid crystal layer 200 can be used for the nanocapsule LCD device 100 with a passive matrix type or an active matrix type nanocapsule LCD device 100.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A nanocapsule liquid crystal display device, comprising:
    a first polarization plate including:
        a first base film,
        a second base film,
        a first polarization layer disposed between the first base film and the second base film, and
        a first adhesion layer disposed on an upper surface of the second base film; a second polarization plate including:
        a third base film,
        a nanocapsule liquid crystal layer including a plurality of nano-sized capsules dispersed in a buffer layer, each of the plurality of nano-sized capsules including a plurality of liquid crystal molecules,
        a second polarization layer disposed between the third base film and the nanocapsule liquid crystal layer, and
        a second adhesion layer disposed on a lower surface of the nanocapsule liquid crystal layer; and
    a substrate including:
        a base substrate,
        a thin film transistor disposed on the base substrate,
        a passivation layer disposed on the thin film transistor,
        a color filter layer disposed on the passivation layer, and
        a pixel electrode and a common electrode disposed on an upper surface of the color filter layer,
    wherein the substrate, including the base substrate, the thin film transistor, the passivation layer, the color filter layer, the pixel electrode and the common electrode, is disposed between the first adhesion layer of the first polarization plate and the second adhesion layer of the second polarization plate, and
    wherein the second adhesion layer of the second polarization plate contacts both the pixel electrode and the common electrode of the substrate.

2. The nanocapsule liquid crystal display device according to claim 1, wherein the second polarization plate further includes a fourth base film.

3. The nanocapsule liquid crystal display device according to claim 2, wherein the fourth base film is between the nanocapsule liquid crystal layer and the second polarization layer.

4. The nanocapsule liquid crystal display device according to claim 3, wherein upper and lower surfaces of the fourth base film contact the nanocapsule liquid crystal layer and the second polarization layer, respectively.

5. The nanocapsule liquid crystal display device according to claim 1, wherein a transmissive axis of the first polarization layer is perpendicular to a transmissive axis of the second polarization layer.

6. The nanocapsule liquid crystal display device according to claim 1, wherein a diameter of each of the plurality of nano-sized capsules is about 1 nm to about 320 nm.

7. The nanocapsule liquid crystal display device according to claim 1, wherein a volume of each of the plurality of nano-sized capsules is about 25% to about 65% of a volume of the nanocapsule liquid crystal layer.

8. The nanocapsule liquid crystal display device according to claim 1, further comprising:
a black matrix between the substrate and the second polarization layer.

9. The nanocapsule liquid crystal display device according to claim 1, further comprising:
a backlight located below the first polarization plate and including a light source.

10. A nanocapsule liquid crystal display device, comprising:
a first polarization plate including:
a first base film,
a second base film,
a first polarization layer disposed between the first base film and the second base film, and
a first adhesion layer disposed on an upper surface of the second base film;
a second polarization plate including:
a third base film,
a nanocapsule liquid crystal layer including a plurality of nano-sized capsules dispersed in a buffer layer, each of the plurality of nano-sized capsules including a plurality of liquid crystal molecules,
a second polarization layer disposed between the third base film and the nanocapsule liquid crystal layer, and
a second adhesion layer disposed on a lower surface of the nanocapsule liquid crystal layer; and
a substrate including:
a base substrate,
a thin film transistor disposed on the base substrate, and
a pixel electrode and a common electrode disposed on the base substrate,
wherein the substrate, including the base substrate, the thin film transistor, the pixel electrode and the common electrode, is disposed between the first adhesion layer of the first polarization plate and the second adhesion layer of the second polarization plate, and
wherein the second adhesion layer of the second polarization plate contacts both the pixel electrode and the common electrode of the substrate.

11. The nanocapsule liquid crystal display device according to claim 10, wherein the second polarization plate further includes a fourth base film, and
wherein the nanocapsule liquid crystal layer is positioned between the second polarization layer and the fourth base film.

* * * * *